March 15, 1955   H. O. SCHJOLIN ET AL   2,704,233
WHEEL BEARING ADJUSTMENT
Filed June 19, 1953   3 Sheets-Sheet 1

INVENTOR.
Hans O. Schjolin
Donald K. Isbell
BY
Their Attorney

March 15, 1955   H. O. SCHJOLIN ET AL   2,704,233
WHEEL BEARING ADJUSTMENT
Filed June 19, 1953   3 Sheets-Sheet 2
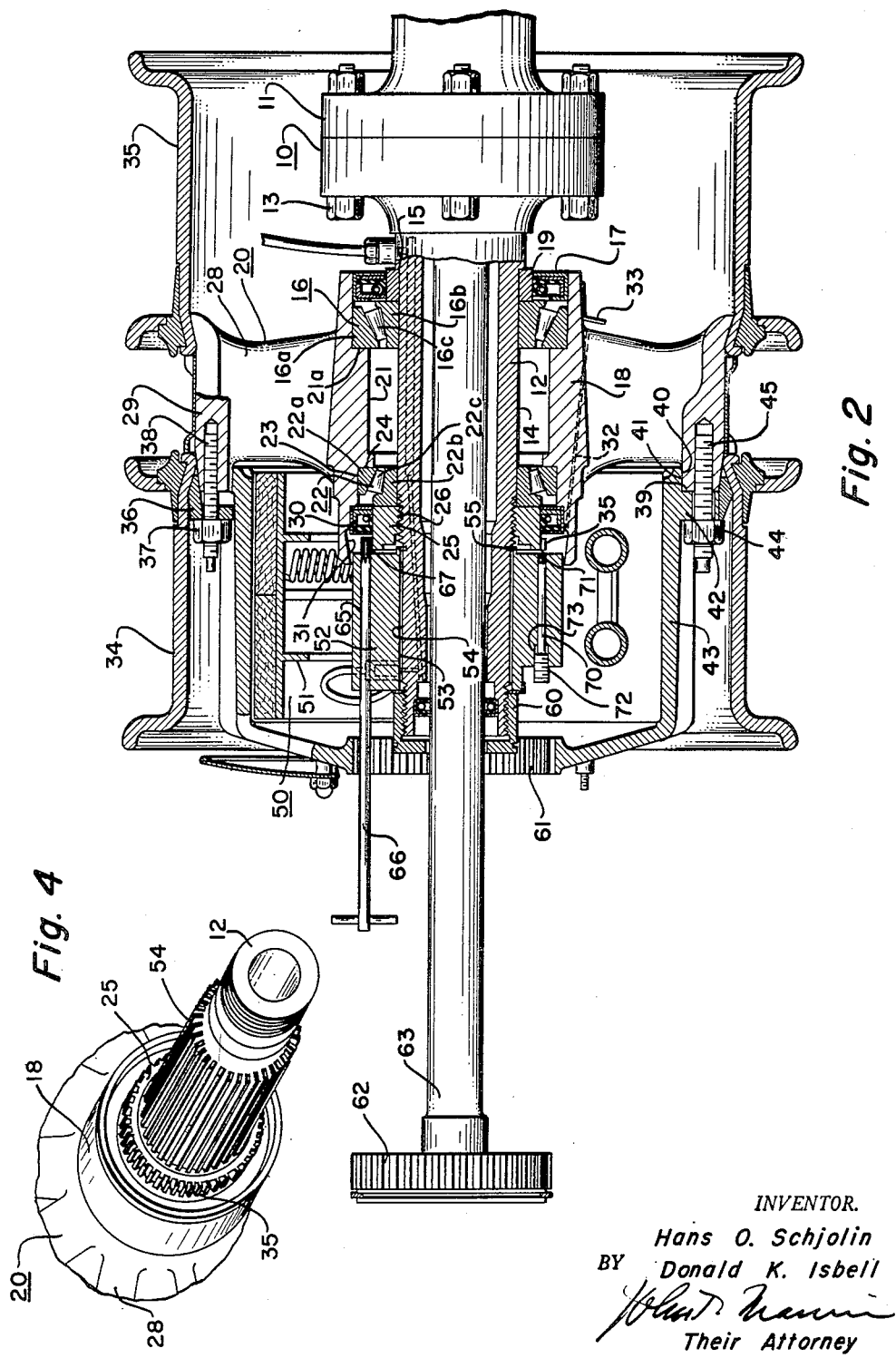
INVENTOR.
Hans O. Schjolin
BY  Donald K. Isbell
Their Attorney

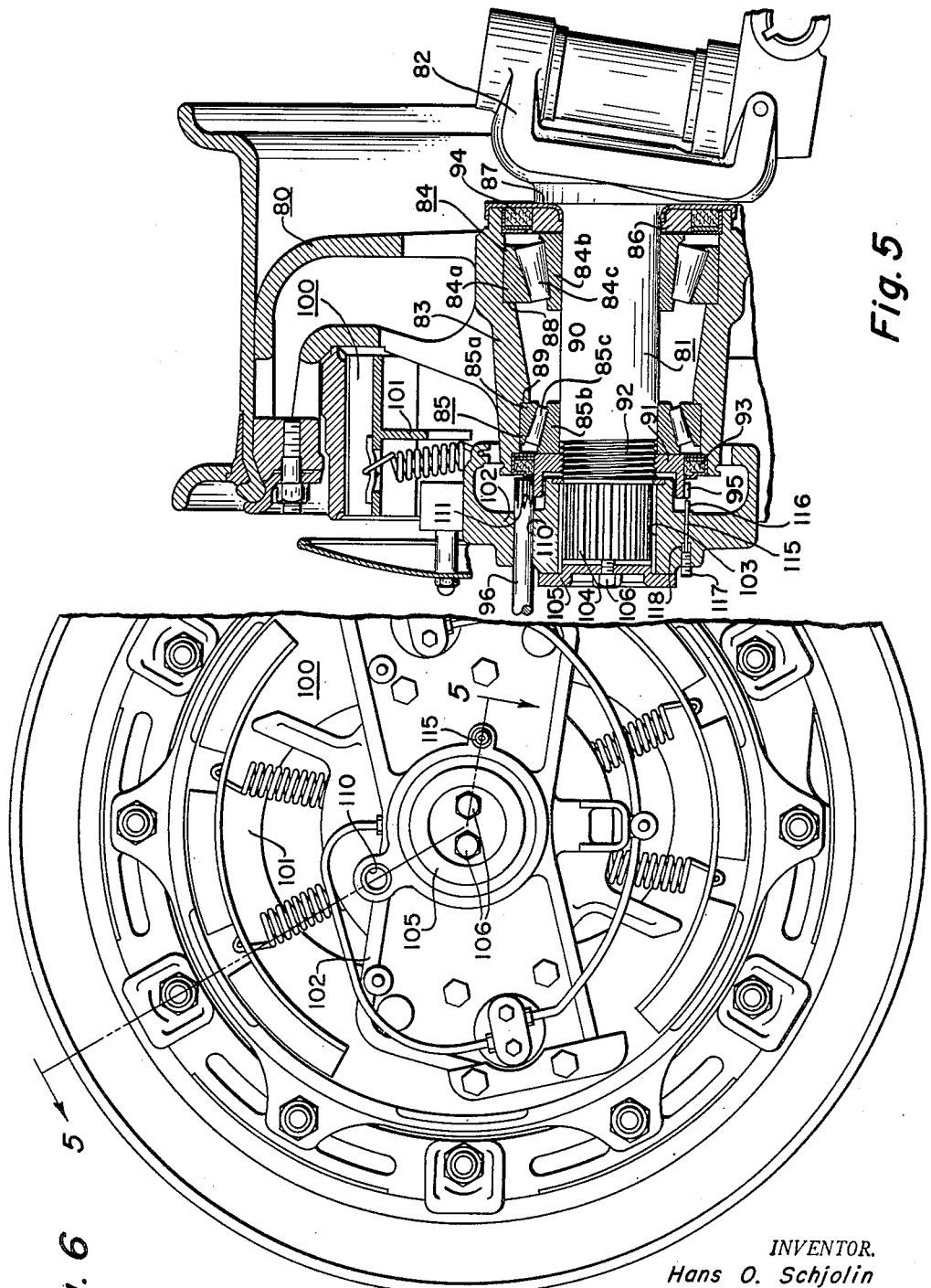

United States Patent Office 2,704,233
Patented Mar. 15, 1955

2,704,233

WHEEL BEARING ADJUSTMENT

Hans O. Schjolin, Birmingham, and Donald K. Isbell, Pontiac, Mich., assignors to General Motors Corporation, Detroit, Mich., a corporation of Delaware Application June 19, 1953, Serial No. 362,875

6 Claims. (Cl. 308—211)

This invention relates to a wheel structure for an automotive vehicle.

One of the disadvantages of currently used wheel structures is the manner in which adjustment of the wheel bearings is attained, the structures being such as to require considerable effort in disassembly to secure the desired adjustment of the wheel bearings. Conventionally, it is the practice to service wheel brakes from the in-board side of the wheel which arrangement allows adjustment of the wheel bearings from the out-board side.

However, it is preferable to provide for service adjustment and assembly of the wheel brakes from the out-board side of the wheel. This gives rise to difficulties in providing for service adjustment of the wheel bearings without requiring disassembly of the brake assembly from the wheels.

It is therefore an object of this invention to provide a wheel structure having a brake assembly that is assembled and serviced from the out-board side of the wheel, the structure being so arranged that the wheel bearings can be serviced for adjustment from the out-board side of the wheel without requiring disassembly of the brake assembly.

It is another object of the invention to provide a wheel assembly incorporating the foregoing object and wherein provision is made in the brake spider of the brake assembly through which an adjusting wrench can be extended into engagement with an adjusting nut for the wheel bearings to rotate the adjusting nut without in any way necessitating disassembly of the brake assembly.

It is another object of the invention to provide a wheel structure wherein a wheel is supported upon an axle by an in-board bearing and an out-board bearing with an adjusting nut engaging the out-board bearing for adjusting the wheel bearing clearance, and wherein a brake spider for a brake assembly is supported on the axle adjacent the adjusting nut substantially confining the same, and also wherein the brake spider is constructed and arranged to provide for access to the adjusting nut without requiring disassembly of the brake spider from the axle.

Further objects and advantages of the present invention will be apparent from the following description, reference being had to the accompanying drawings wherein a preferred form of the invention is clearly shown.

In the drawings:

Figure 2 is a cross sectional view taken along line 2—2 of Figure 1.

Figure 4 is a perspective elevational view of the wheel axle illustrating the position of the adjusting nut for the wheel bearing relative to the wheel hub.

Figure 5 is a cross sectional view taken along line 5—5 of Figure 6 of a slightly modified arrangement of the structure of the invention.

Figure 6 is an elevational view of the modified structure of the wheel illustrated in Figure 5.

Figures 1, 3:
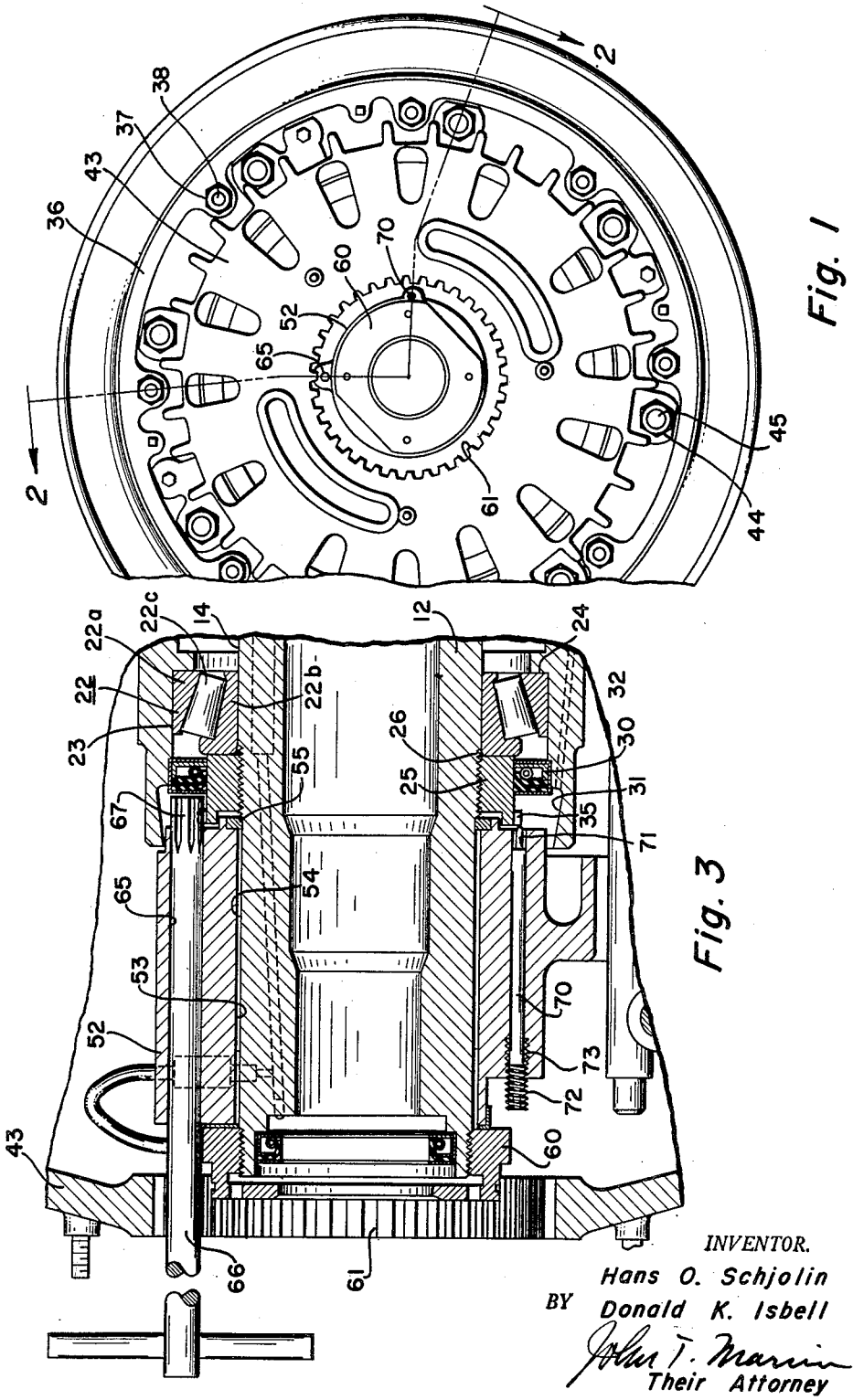
Figure 1 is an end elevational view of a wheel structure incorporating features of this invention.
Figure 3 is an enlarged cross sectional view of a portion of the structure of Figure 2 to illustrate certain detail portions of the invention more clearly.

In this invention the wheel structure includes an axle housing 10 that includes a housing part 11 integral with the differential housing of an automotive vehicle and a housing part 12 that is attached to the housing part 11 by the bolts 13, the wheel structure illustrated in Figures 1 through 4 inclusive being that of a rear wheel for an automotive vehicle.

The axle housing 12 has a reduced diameter portion 14 forming a smooth cylinder with a shoulder 15 in the in-board end of the axle housing, the in-board end of the housing being that disposed nearest the differential of the automotive vehicle.

A wheel bearing 16, referred to herein as the in-board bearing, is placed upon the cylindrical portion 14 of the housing 12. The bearing 16 is of the type known as a tapered roller bearing that includes the outer race 16a, an inner race 16b, and the roller bearings 16c. The inner race 16b engages a spacer ring 19 that is positioned between the inner race 16b and the shoulder 15 on the axle housing 12, thus fixing the axial position of the inner race 16b relative to the axle housing 12.

The outer race 16a supports one end of the hub 18 of a wheel 20, the wheel having a bore 21 provided with a shoulder 21a that is engaged by the outer race 16a whereby axial movement of the hub 18 relative to the axle housing 12 in a rightward direction, as viewed in Figure 2, will cause reducing clearance between the outer race 16a and the inner race 16b to remove excessive clearance in the wheel bearing assembly 16.

A grease seal 17 is positioned around the spacer ring 19 to prevent leakage of grease from within the bore 21 provided in the hub 18 to lubricate the bearing 16.

At the opposite end of the wheel hub 18 there is provided a second wheel bearing 22 that is supported upon the cylindrical portion 14 of the axle housing 12. The wheel bearing 22 referred to herein as the out-board bearing, consists of an outer race 22a, an inner race 22b, and tapered roller bearings 22c. The inner race 22b is supported upon the cylindrical portion 14 of the axle housing 12, the outer race 22a being received within a recess 23 provided in the forward end of the wheel hub 18, the race 22a resting against a shoulder 24 formed by the recess 23.

A bearing adjusting nut 25 is threadedly received on the threaded portion 26 at the forward end of the cylindrical portion of the axle housing 12. The adjusting nut 25 bears against the inner race 22b of the out-board bearing 22 to cause the out-board bearing to press against the hub 18 for movement thereof in a rightward direction upon rotation of the adjusting nut 25 and thereby remove excessive clearance from the out-board bearing assembly 22 and the in-board bearing assembly 16.

A grease seal 30 is provided at the forward end of the wheel hub 18 to prevent grease leakage through the out-board bearing 22.

The forward end of the wheel hub 18 has an angularly disposed wall 31 forming a cone shaped chamber that provides a grease trap for any leakage of grease through the out-board grease seal 30, a passage 32 being provided to carry the grease to the in-board side of the wheel. A dirt shield 33 is placed at the end of the passage 32.

The adjusting nut 25 carries an annular ring of teeth 35 around the outer periphery thereof and at the forward edge of the adjusting nut 25. This annular ring of teeth is used for rotating the adjusting nut 25 to adjust the bearing clearance of both the out-board 22 and the in-board bearing 16 in a manner hereafter described.

The wheel 20, which includes the hub 18, also includes a supporting structure comprising a plurality of individual spokes 28 that form a spider structure between the hub 18 and the rim portion 29 of the wheel 20. The rim portion 29 supports the tire rims 34 and 35, they being secured to the wheel rim 29 by the rim ring 36 and the nuts 37 carried on the threaded studs 38 projecting from the wheel rim 29.

The wheel rim 29 has a plurality of seat pads formed by coextensive angularly disposed faces 39 and 40. The seat pads formed by the angularly disposed faces 39 and 40 are engaged by an annular rim portion 41 and the lugs 42 provided on a brake drum 43. The brake drum 43 is secured to the wheel rim 29 by the nuts 44 threaded upon the studs 45 projecting from the wheel rim 29. The brake drum 43 is thus removably secured to the rim portion 29 of the wheel 20.

A brake assembly 50 is positioned on the axle housing 12 adjacent the out-board end of the wheel hub 18 and adjacent the adjusting nut 25 for the wheel bearings 22 and 16. The brake assembly 50 includes a brake spider 51 having a hub portion 52. The hub 52 of the brake spider has an internal spline 53 that is received upon an external spline 54 provided on the axle housing 12. A stop ring 55 is received on the spline 54 and engages the forward edge of the threaded portion 26 on the axle housing 12 to thus fix the position of the brake spider 51 upon the axle housing 12. It will thus be seen that the hub 52 of the brake assembly thus substantially confines the adjusting nut 25 for the wheel bearings 22 and 16.

The brake assembly 50 is retained on the axle housing 12 by means of a retaining nut or ring 60 that is threaded upon the end of the axle housing 12.

The brake drum 43 has an internally splined axial opening 61 that receives the externally splined head 62 provided on the end of the axle 63 whereby the wheel 20 is driven from the axle 63 through the brake drum 43.

To provide for adjustment of the wheel bearings 22 and 16, the hub 52 of the brake assembly 50 is provided with an opening 65 adapted to receive a tool 66 that has a pinion 67 on the forward end thereof adapted to mesh with the teeth 35 of the tooth ring provided on the adjusting nut 25. Thus rotation of the tool 66 will cause rotation of the adjusting nut 25 in one direction or the other to provide for the desired degree of adjustment of the bearing clearance of both the out-board bearing 22 and the in-board bearing 16 for the wheel 20.

A locking member 70 has a reduced diameter pin 71 on one end thereof adapted to be positioned between adjacent teeth of the tooth ring 35 on the adjusting nut 25. The locking member 70 has the forward end provided with the threaded portion 72 that is in threaded engagement with the threaded hole 73 in the hub 52 of the brake assembly 50.

When the wheel bearings 22 and 16 are to be adjusted, the locking member 70 will be retracted to the position illustrated in Figures 2 and 3, whereupon the desired rotation of the adjusting nut 25 can be accomplished. When satisfactory adjustment has been made, the locking member 70 will be then threaded into the hub 52 of the brake spider to place the pin end 71 between adjacent teeth on the adjusting nut 25 and thereby prevent any subsequent rotation of the adjusting nut 25.

In Figures 5 and 6 there is illustrated a slightly modified arrangement of the wheel structure as adapted to the front wheel of an automotive vehicle. In this modified arrangement the wheel structure 80 is carried upon an axle 81 that extends from a kingpin housing 82.

The wheel structure 80 includes a wheel hub 83 that is supported upon an in-board wheel bearing 84 and an out-board wheel bearing 85.

The in-board wheel bearing 84 includes an outer race 84a, an inner race 84b, and tapered roller bearings 84c. Similarly, the out-board bearing 85 includes an outer race 85a, an inner race 85b, and tapered roller bearings 85c.

The inner race 84b of the in-board bearing 84 engages a spacer ring 86 that in turn engages a shoulder 87 on the axle 81 whereby to fix the position of the wheel bearing 84 on the axle 81. The outer race 84a engages a shoulder 88 provided in the bore 89 of the wheel hub 83.

Similarly the outer race 85a of the out-board bearing 85 engages a shoulder 90.

An adjusting nut or ring 91 is in threaded engagement with the threaded end 92 on the axle 81, the adjusting ring 91 engaging the inner race 85b of the out-board bearing 85. A grease seal 93 is positioned adjacent the out-board bearing 85 and a grease seal 94 is placed adjacent the in-board bearing 84.

The adjusting ring or nut 91 has a tooth ring 95 on the forward edge thereof, the series of teeth provided in the tooth ring 95 being adapted for engagement by a tool 96 to rotate the adjusting ring 91 upon the axle 81 and thereby remove excessive clearance from the wheel bearings 84 and 85.

A brake assembly 100 including a spider 101 having a hub 102 is positioned on the out-board side of the wheel 80 with the brake hub 102 being positioned adjacent the adjusting ring 91 and substantially confining the same.

The spider hub 102 has an internal spline 103 that engages an external spline 104 on the forward end of the axle 81 to prevent relative rotation therebetween, the hub 102 being retained on the spline 104 by a retaining plate 105 secured by the bolt 106.

The spider or brake hub 102 has an opening 110 therein aligned with the tooth ring 95 on the adjusting ring 91 adapted to receive the tool 96 whereby the pinion 111 on the end of the tool 96 can engage the tooth ring 95 for rotation of the adjusting ring or nut 91.

A locking member 115 has the pin end 116 thereof adapted for placement between adjacent teeth of the tooth ring 95 to lock the adjusting ring 91 in a selected position. The opposite end of the locking member 115 has a threaded portion 117 in threaded engagement with a threaded opening 118 in the hub 102 to retain the locking member in the hub 102.

When the bearing assemblies 84 and 85 are to be adjusted, the locking member 115 is in the position illustrated in Figure 5 to permit rotation of the adjusting ring 91 by the tool 96, whereafter, the pin end 116 of the locking member 115 will be inserted between adjacent teeth of the tooth ring 95.

While the form of embodiment of the invention as herein disclosed constitutes a preferred form, it is to be understood that other forms might be adopted as may come within the scope of the claims which follow.

What is claimed is as follows:

1. In a wheel structure for an automotive vehicle, the combination of, an axle, a wheel including a hub, adjustable bearing means between said hub and said axle for journaling of the wheel on the axle, an adjusting member on said axle engageable with said bearing means for clearance adjustment thereof, a brake assembly on said axle, said brake assembly and said wheel substantially enclosing said adjusting member in a manner that prevents access thereto, said brake assembly including channel means through the same aligned with said adjusting member through which a tool can be inserted from the out-board side of the brake assembly into engagement with said adjusting member for actuation thereof.

2. In a wheel structure for an automotive vehicle, the combination of, an axle, a wheel including a hub, adjustable bearing means between said hub and said axle for journaling of the wheel on the axle, an adjusting member on said axle engageable with said bearing means for clearance adjustment thereof, a brake assembly on said axle, said brake assembly and said wheel substantially enclosing said adjusting member in a manner that prevents access thereto, said brake assembly including channel means through the same aligned with said adjusting member through which a tool can be inserted from the out-board side of the brake assembly into engagement with said adjusting member for actuation thereof, said brake assembly also including a locking member accessible from the out-board side of the brake assembly for movement into and out of engagement with said adjusting member to respectively lock or unlock the same.

3. In a wheel structure for an automotive vehicle, the combination of, an axle, a wheel including a hub, adjustable bearing means between said hub and said axle for journaling of said wheel on said axle, an adjusting member on said axle engageable with said bearing means for clearance adjustment of the same, said adjusting member having an annular tooth ring thereon, a brake assembly on said axle on the outboard side of said wheel, said brake assembly and said wheel enclosing said adjusting member in a manner to prevent ready access to the same, said brake assembly including channel means therein aligned with said tooth ring on said adjusting member to receive a tool through the brake assembly from the out-board side thereof into operative engagement with said tooth ring to effect adjusting movement of said adjusting member.

4. A wheel structure in accordance with claim 3 that includes a locking pin extending through said brake assembly and carried thereby and accessible from the out-board side of the brake assembly for movement into and out of engagement with said adjusting member to respectively lock and unlock the same.

5. In a wheel structure for an automotive vehicle, the combination of, an axle, a wheel including a hub, bearing means between said hub and said axle journaling the wheel on the axle, an adjusting member on said axle engageable with said bearing means for clearance adjustment of the same, said adjusting member having a peripheral tooth ring thereon, a brake assembly having a brake hub mounting the said assembly on said axle, said brake hub being disposed adjacent said adjusting member and effectively confining the said adjusting member to prevent ready access to the same, said hub having a passage therein aligned with said tooth ring whereby a tool can be projected through said hub from the outboard side thereof into engagement with said tooth ring to actuate said adjusting member.

6. A wheel structure in accordance with claim 5 that includes a locking pin extending through said brake hub for movement into and out of engagement with said adjusting member for locking and unlocking of the same.

References Cited in the file of this patent

UNITED STATES PATENTS

| | | |
|---|---|---|
| 1,757,953 | Chase | May 13, 1930 |
| 2,510,896 | Le Tourneau | June 6, 1950 |
| 2,647,025 | Deffenbaugh | July 28, 1953 |